United States Patent
Liu

(10) Patent No.: US 9,383,053 B2
(45) Date of Patent: Jul. 5, 2016

(54) SUCTION NOZZLE COVER AND ELECTRONIC CIGARETTE

(71) Applicant: Qiuming Liu, Shenzhen (CN)

(72) Inventor: Qiuming Liu, Shenzhen (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 400 days.

(21) Appl. No.: 13/889,888

(22) Filed: May 8, 2013

(65) Prior Publication Data

US 2014/0261497 A1    Sep. 18, 2014

Related U.S. Application Data

(63) Continuation of application No. PCT/CN2013/072549, filed on Mar. 13, 2013.

(51) Int. Cl.
*A24F 47/00* (2006.01)
*F16L 55/115* (2006.01)

(52) U.S. Cl.
CPC ............. *F16L 55/115* (2013.01); *A24F 47/008* (2013.01)

(58) Field of Classification Search
CPC ........... A24F 47/008; A24F 7/02; A24F 5/00; A24F 5/10; A24D 3/04; A24D 3/041; A24D 3/043; A24D 3/045
USPC ................... 215/307, 310, 354; 131/225, 228
See application file for complete search history.

(56) References Cited

U.S. PATENT DOCUMENTS

| | | | | |
|---|---|---|---|---|
| 4,446,878 | A * | 5/1984 | Porenski, Jr. | 131/336 |
| 4,540,005 | A * | 9/1985 | Cantrell et al. | 131/336 |
| 4,557,281 | A | 12/1985 | Litzinger, Jr. et al. | |
| 4,681,125 | A * | 7/1987 | Johnson | 131/336 |
| 2007/0095357 | A1 | 5/2007 | Besso et al. | |
| 2013/0192615 | A1 * | 8/2013 | Tucker et al. | 131/328 |
| 2013/0228191 | A1 * | 9/2013 | Newton | 131/329 |

FOREIGN PATENT DOCUMENTS

| | | |
|---|---|---|
| CN | 101495004 A | 7/2009 |
| CN | 201938355 U | 8/2011 |
| CN | 202354377 U | 8/2012 |
| CN | 202496403 U | 10/2012 |

OTHER PUBLICATIONS

International Search Report for Application No. PCT/CN2013/072549 dated Dec. 26, 2013.

* cited by examiner

*Primary Examiner* — Michael H Wilson
*Assistant Examiner* — Eric Yaary
(74) *Attorney, Agent, or Firm* — Tim Tingkang Xia, Esq.; Locke Lord LLP

(57) ABSTRACT

A suction nozzle cover and an electronic cigarette. The electronic cigarette includes a tube and a suction nozzle cover. The suction nozzle cover includes a cap and a cover body which extends along a lower surface of the cap. An annular platform is formed by the cap with respect to a periphery of the cover body. A lateral wall of the annular platform is at least provided with one first suction outlet, a lateral wall of the cover body is at least provided with one first groove, and the first groove and the suction outlet are connected to each other to form a channel for smoke extraction.

5 Claims, 7 Drawing Sheets

US 9,383,053 B2

SUCTION NOZZLE COVER AND ELECTRONIC CIGARETTE

CROSS-REFERENCE TO RELATED APPLICATIONS

This application is a continuation of International Patent Application No. PCT/CN2013/072549, with an international filing date of Mar. 13, 2013, designating the United States, now pending. The contents of these specifications are incorporated herein by reference.

FIELD OF THE INVENTION

This invention relates to a field of daily electronic products, more particularly, to a suction nozzle cover and an electronic cigarette.

BACKGROUND OF THE INVENTION

Electronic cigarette, also known as virtual cigarette, is used mainly for smoking cessation or serving as alternative of cigarette. Monolithic construction is widely used for most of electronic cigarettes in the market at present, the concrete structure of which is embodied via equipping power unit and atomization device at front end and tail end of the electronic cigarette respectively. The atomization device is driven by the electricity provided by the power unit and generates smoke for the purpose of providing users with the feeling similar to real one of smoking. Meanwhile, LED (Light-emitting Diode) light of the power unit is lighten to further simulate the effect of burning cigarette.

The suction outlet of an electronic cigarette is mounted on the top of suction nozzle cover in the prior art. As a result, there is a great possibility that users imbibe tobacco tat particles in case of smoking, which brings terrible feeling to users.

SUMMARY OF THE INVENTION

Aiming at the above-mentioned drawbacks in the prior art including the high possibility of imbibing tobacco tar particles in case of using the electronic cigarette, the objective of the present invention is to provide users with a kind of electronic cigarette of good user experience.

The technical solution of the present invention is implemented via providing a suction nozzle cover comprising a cap and a cover body which extends along a lower surface of the cap; an annular platform is formed by the cap with respect to a periphery of the cover body; a lateral wall of the annular platform is provided with one suction outlet at least, a lateral wall of the cover body is provided with one first groove at least, and the first groove and the corresponding suction outlet are connected to each other to form a channel for smoke extraction.

In the suction nozzle cover of the present invention, the first groove and the suction outlet are connected to each other to appear as L-shaped.

In the suction nozzle cover of the present invention, the suction nozzle cover further comprises a connecting part for mounting the suction nozzle cover onto a tube; the connecting part is disposed on an end of the cover body distal from the cap; a buckle or a slot is arranged on a lateral wall of the connecting part for an snap-fit connection with an inner wall of the tube.

In the suction nozzle cover of the present invention, the cap, the cover body and the connecting part are formed integrally.

In the suction nozzle cover of the present invention, the connecting part is at least provided with one second groove which is connected to the first groove.

In the suction nozzle cover of the present invention, the lateral wall of the cap is provided with four suction outlets uniformly distributed thereon, the lateral wall of the cover body is provided with four first grooves uniformly distributed thereon, wherein each of the first grooves corresponds to one of the suction outlets respectively.

In the suction nozzle cover of the present invention, the connecting part is provided with four second grooves uniformly distributed thereon, each of which corresponds to one of the first grooves respectively.

In the suction nozzle cover of the present invention, the suction outlet is any one of square groove, circular groove and waist-shaped groove.

In the suction nozzle cover of the present invention, the first groove is any one of square groove, circular groove and waist-shaped groove.

The present invention also provides an electronic cigarette which comprises a tube and a suction nozzle cover; the suction nozzle cover comprises a cap and a cover body, wherein the cap is mounted on the top of the tube, and the cover body extending along a lower surface of the cap is installed inside the tube; an annular platform is formed by the cap with respect to a periphery of the cover body; a lateral wall of the annular platform is provided with one suction outlet at least, a lateral wall of the cover body is provided with one first groove at least, and the first groove and the corresponding suction outlet are connected to each other to form a channel for smoke extraction and for changing a flow direction of the smoke.

In the electronic cigarette of the present invention, the first groove and the suction outlet are connected to each other to appear as L-shaped.

In the electronic cigarette of the present invention, the suction nozzle cover further comprises a connecting part for mounting the suction nozzle cover onto the tube; the connecting part is disposed on an end of the cover body distal from the cap.

In the electronic cigarette of the present invention, a lateral wall of the connecting part and an inner wall of the tube are respectively provided with a buckle and a slot for a snap-fit connection between the two.

In the electronic cigarette of the present invention, a lateral wall of the connecting part and an inner wall of the tube are respectively provided with a slot and a buckle for a snap-fit connection between the two.

In the electronic cigarette of the present invention, the connecting part is provided with a second groove, wherein the cap, the cover body and the connecting part are formed integrally.

In the electronic cigarette of the present invention, the connecting part is at least provided with one second groove which is connected to the first groove to form a channel for smoke extraction.

In the electronic cigarette of the present invention, the lateral wall of the cap is provided with four suction outlets uniformly distributed thereon, the lateral wall of the cover body is provided with four first grooves uniformly distributed thereon, wherein each of first grooves corresponds to one of the suction outlets respectively.

In the electronic cigarette of the present invention, the connecting part is provided with four second grooves uniformly distributed thereon, each of which corresponds to one of the first grooves respectively.

In the electronic cigarette of the present invention, the suction outlet is any one of square groove, circular groove and waist-shaped groove.

In the electronic cigarette of the present invention, the first groove is any one of square groove, circular groove and waist-shaped groove.

When implementing the present invention, the following advantageous effects can be achieved: the suction outlet is disposed on the lateral wall of the cap and thus the smoke may be turned by a certain degree before it is taken in by users, which is able to effectively prevent users from imbibing tobacco tar particles during the usage and provide users with an excellent user experience. Besides, since the suction outlets are disposed on the lateral wall of the cap, it can meet the need of individual requirements of different users.

BRIEF DESCRIPTION OF THE DRAWINGS

The present invention will be illustrated in accordance with the accompanying drawings and the embodiments in the following. In the figures.

DETAILED DESCRIPTION OF THE PREFERRED EMBODIMENT

Specific implementations of the present invention is explained in detail in accordance with accompanying drawings so that the technical feature, objective and effect of the present invention can be understood more clearly.

Figure 1:
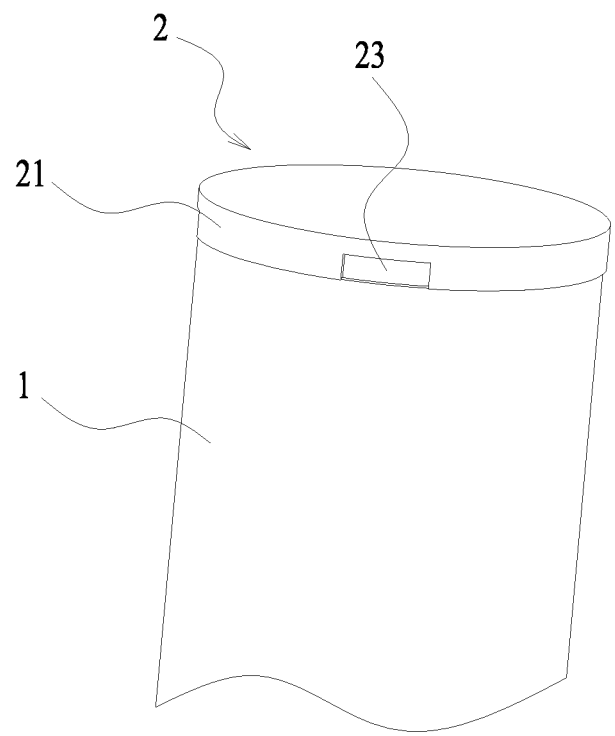
FIG. 1 is a schematic diagram of partial structure of the electronic cigarette provided in a first preferred embodiment of the present invention.
Figure 2:
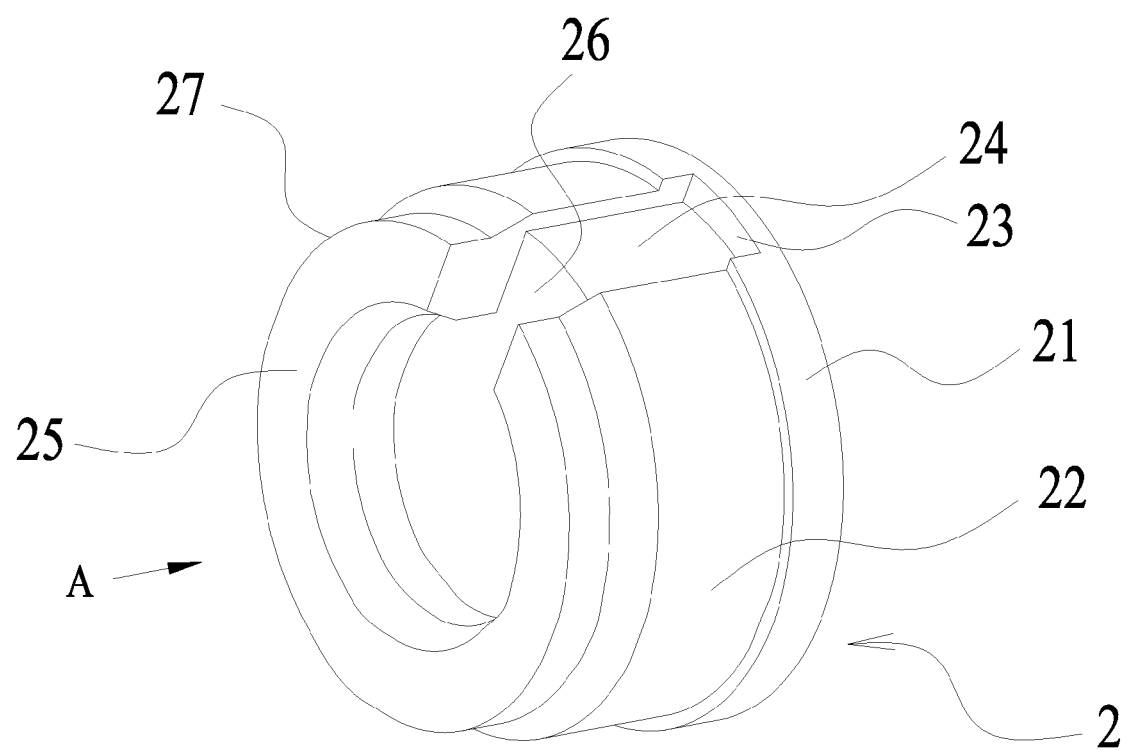
FIG. 2 is a schematic diagram illustrating a three-dimensional structure of suction nozzle cover of the electronic cigarette shown in FIG. 1.
Figure 3:
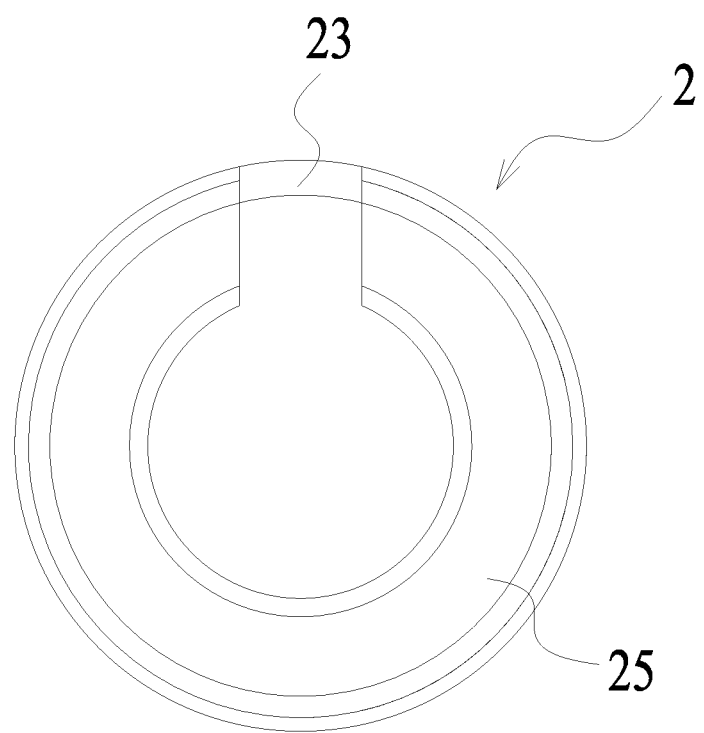
FIG. 3 is a view for the suction nozzle cover shown in FIG. 2 in the orientation A.
Figure 4:
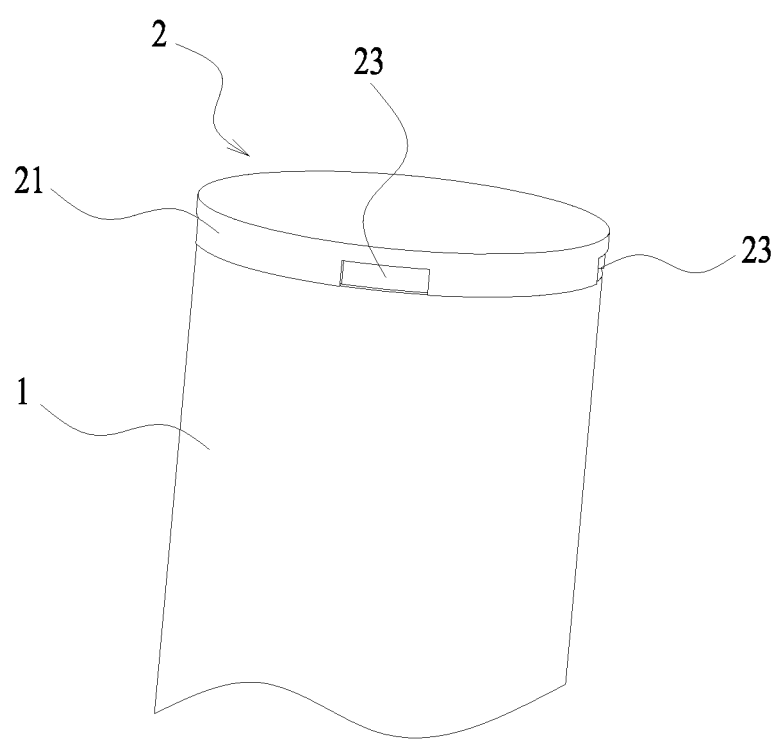
FIG. 4 is a schematic diagram of partial structure of the electronic cigarette provided in a second preferred embodiment of the present invention.
Figure 5:
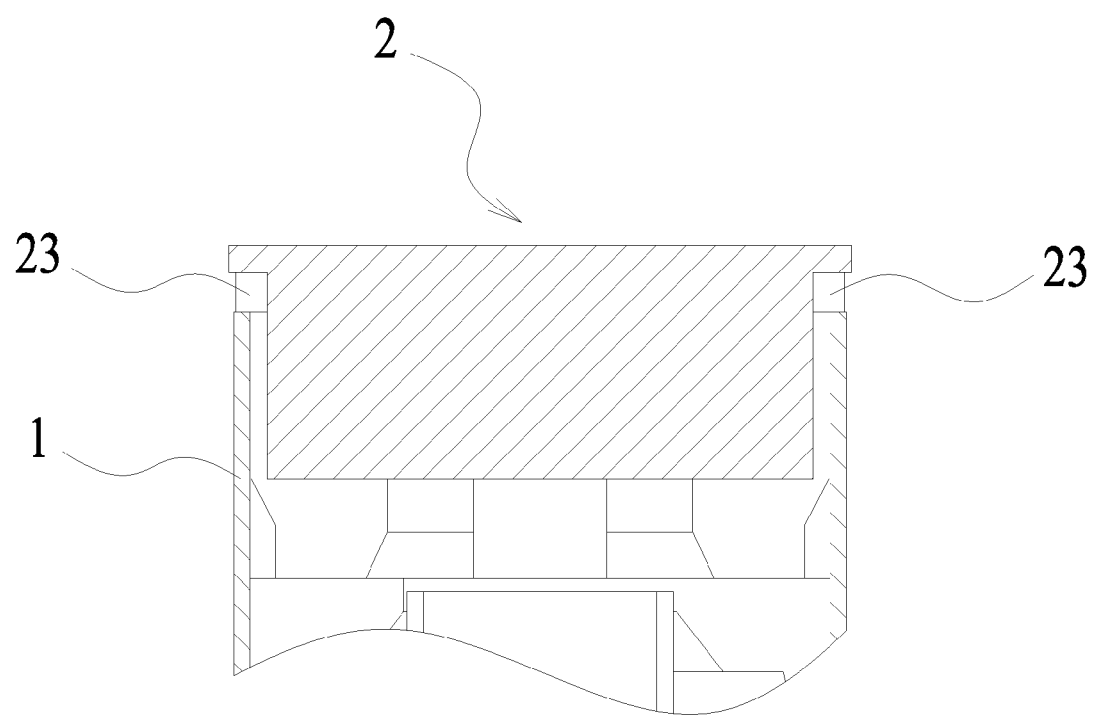
FIG. 5 is a schematic diagram illustrating a partial sectional structure of the electronic cigarette shown in FIG. 4.
Figure 6:
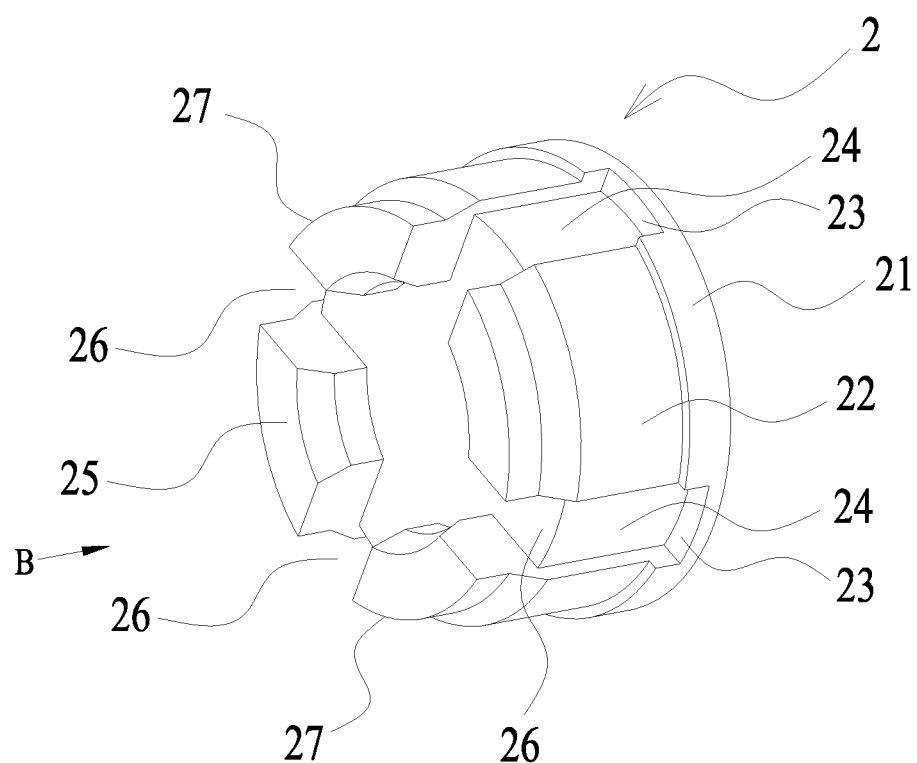
FIG. 6 is a schematic diagram illustrating a three-dimensional structure of the suction nozzle cover of the electronic cigarette shown in FIG. 5.
Figure 7:
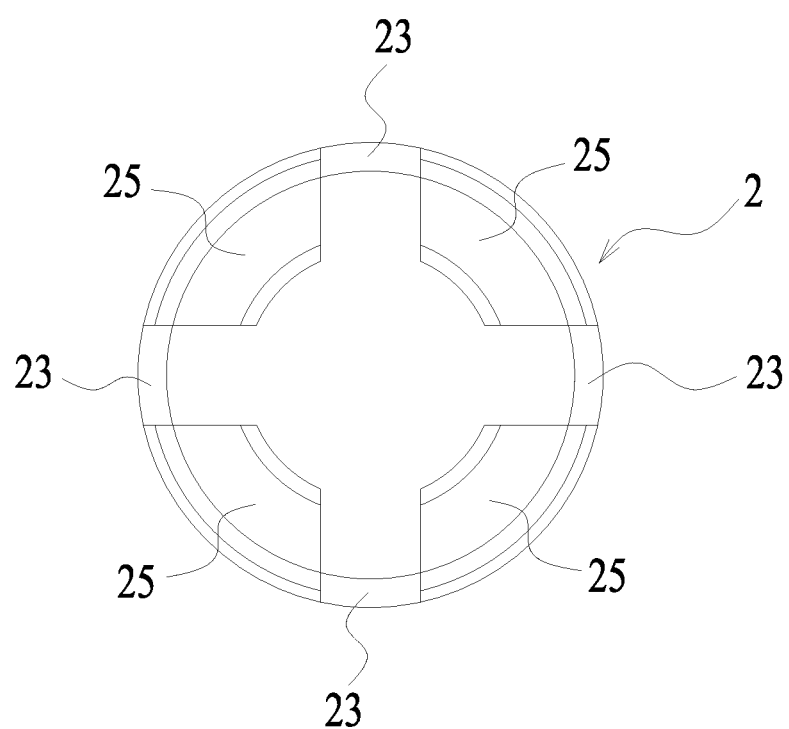
FIG. 7 is a view for the suction nozzle cover shown in FIG. 6 in the orientation B.

As shown in FIG. 1, FIG. 2 and FIG. 3, suction nozzle cover 2 appears as a circular plat structure, which is mounted on the top of a tube 1 and comprises a cap 21 and a cover body 22 that extends along the lower surface of cap 21 in a first preferred embodiment in the present invention. Suction nozzle cover 2 is made of silica gel material and possesses several characteristics including good elasticity and corrosion resistance in the embodiment. It is understood that suction nozzle cover 2 can also be made of flexible materials including rubber.

An annular platform is formed by the cap 21 with respect to a periphery of the cover body 22, and the cap 21 is mounted on the top of the tube 1. Lateral wall of the annular platform is provided with one suction outlet 23 at least. Herein, one suction outlet 23 with a square groove structure is provided in the embodiment. It is understood that following structures such as circular groove and waist-shaped groove can also be used for the suction outlet 23, which brings about diversiform appearances to the suction nozzle cover 2 and meets users' individual consumption requirements. The cover body 22 is installed inside the tube 1, and its lateral wall is at least provided with a first groove 24. There is one first groove 24 with a square groove structure in the embodiment. It is understood that following structures such as circular groove and waist-shaped groove can also be used for the first groove 24. As the first groove 24 and the suction outlet 23 are connected, a smoke extraction channel for changing the flow direction of smoke is established. Moreover, the two are connected to each other to appear as L-shaped. In this case, the smoke generated by the electronic cigarette is exhausted out of the tube 1 after it has passed through the first groove 24 and the suction outlet 23 in sequence. In this process, it seems the smoke firstly rises along the tube 1 and passes through the first groove 24, and then it is vented from the suction outlet 23 along an orientation vertical to the tube 1. That is, the smoke will change its flow direction when passing through the first groove 24 and the suction outlet 23 sequentially, as a result of which the smoke may be turned by a certain degree before it is taken in by users. Meanwhile, some tobacco tar particles carried in the smoke are blocked effectively inside the tube 1, which improves user experience effectively via preventing users from imbibing tobacco tar particles. The included angle that is formed between the first groove 24 and the suction outlet 23 can be designed to range from 70 degrees to 120 degrees, the optimized angle of which is between 85 degrees and 100 degrees. The included angle mentioned above in the embodiment is 90 degrees.

As shown in FIG. 2 and FIG. 3, in the embodiment, the suction nozzle cover 2 also includes a connecting part 25 disposed at an end of the cover body 22 far away from the cap 21. The suction nozzle cover 2 is mounted on the top of the tube 1 according to the connecting part 25. In this embodiment, the lateral wall of the connecting part 25 is provided with a convex shaped buckle 27, and the inner wall of the tube 1 is correspondingly provided with slot(s) (not shown in accompanying figures) which is in snap-fit connection with the buckle 27. The suction nozzle cover 2 is detachably mounted on the top of the tube 1 because of the snap-fit connection between the slot(s) and the buckle 27. It is understood that in some other embodiments, the lateral wall of the connecting part 25 is provided with slot(s) (not shown in accompanying figures), and the inner wall of the tube 1 is correspondingly provided with buckle(s) which is(are) in snap-fit connection with the slot(s) (not shown in accompanying figures). The suction nozzle cover 2 is in fixed connection with top end of the tube 1 according to the structure mentioned above. The cap 21, the cover body 22 and the connecting part 25 within the suction nozzle cover 2 are formed integrally, which is thus easy in process and excellent in its integrity effect.

The connecting part 25 is at least provided with one second groove 26. The second groove 26 and the first groove 24 are connected to each other and a channel for smoke extraction is formed therefore. The smoke generated from the electronic cigarette passes through the second groove 26 and the first groove 24 in sequence. One second groove 26 with a square groove structure is provided in the embodiment. It is understood that following structures including circular groove and waist-shaped groove can be adopted for the second groove 26 as well. The adoption of the structure of the second groove 26 for the connecting part 25 serves as a force discharging groove, which enables an easily snap-fit connection between the connecting part 25 and the tube 1.

As shown in FIG. 4, FIG. 5, FIG. 6 and FIG. 7, the numbers of the suction outlet 23, the first groove 24 and the second groove 26 of the suction nozzle cover 2 in the second preferred embodiment of the present invention are different from those in the first preferred embodiment. The lateral wall of the annular platform of the cap 21 is provided with four suction outlets 23 uniformly distributed thereon, the lateral wall of the cover body 22 is provided with four first grooves 24 uniformly distributed thereon, and each of the first grooves 24 connects to the corresponding suction outlet 23 so as to establish the channel for smoke extraction. The connecting part 25 is provided with four second grooves accordingly, which connects to the corresponding first groove 24 respectively so as to establish the channel for smoke extraction. It is understood that there is no limitation to the number and the shape of suction outlet 23, the first grooves 24 and the second grooves 26 of the suction nozzle cover 2, while there are some other alternatives to be provided.

In regard to the above-mentioned suction nozzle cover 2, a total area of the suction outlets 23 located at the lateral wall of the annular platform is between two square millimeters and six square millimeters. The smoke flow will be too low in case the total area is less than two square millimeters, and there will be a great possibility that the smoke is accumulated inside the electronic cigarette and further causes damage to the electronic cigarette. Instead, large quantity of smoke flow will be generated in case the total area is more than two square millimeters, which affects the taste of the electronic cigarette for users in case of smoking. Herein, the optimal area is selected to be 4 square millimeters in the above-mentioned embodiment.

The present invention also discloses an electronic cigarette on the basis of the structure of above-mentioned suction nozzle cover 2. The electronic cigarette comprises a tube 1 and any one of the above-mentioned suction nozzle covers 2. In the electronic cigarette provided in the above-mentioned embodiments, suction outlet 23 is disposed on the lateral wall of the cap 21, which is able to effectively prevent users from imbibing tobacco tar particles during the usage and provide users with an excellent user experience. Besides, since the suction outlet 23 is disposed on the lateral wall of the cap 21, it can meet the need of individual requirements of different users.

The embodiments of the present invention are described according to the accompanying figures, however, the present invention shall not be limited to the above-mentioned embodiments which are only considered as some demonstrations instead of limitation to the present invention. Lots of modalities can be made by the one skilled in the art with the help of the inspiration from the present invention without breaking away from the principle and scope of protection of the claims, wherein these modalities are within the scope to be protected by the present invention.

The invention claimed is:

1. An electronic cigarette comprising a tube and a suction nozzle cover, wherein the suction nozzle cover comprises a cap and a cover body which extends along a lower surface of the cap; wherein an annular platform is formed by the cap with respect to a periphery of the cover body; a lateral wall of the annular platform is provided with four suction outlets uniformly distributed thereon, a total area of the suction outlets is between two square millimeters and six square millimeters: a lateral wall of the cover body is provided with four first grooves uniformly distributed thereon; each of the first grooves corresponds to one of the suction outlets respectively: the first groove and the corresponding suction outlet are connected to each other to form a channel for smoke extraction, the cap is a closed structure, an angle is formed between the first groove and the corresponding suction outlet for effectively blocking tobacco tar particles carried in smoke, and the angle is designed to be 90 degrees;

wherein the suction nozzle cover further comprises a connecting part for mounting the suction nozzle cover onto a tube: the connecting part is disposed on an end of the cover body distal from the cap: a buckle or a slot is arranged on a lateral wall of the connecting part for a snap-fit connection with an inner wall of the tube;

wherein the connecting part is provided with four second grooves, each of which corresponds to one of the first grooves respectively: and each second groove is connected to the corresponding first groove.

2. The electronic cigarette according to claim 1, wherein the first groove and the suction outlet are connected to each other to appear as L-shaped.

3. The electronic cigarette according to claim 1, wherein the cap, the cover body, and the connecting part are formed integrally.

4. The electronic cigarette according to claim 1, wherein the suction outlet is any one of square groove, circular groove, and waist-shaped groove.

5. The electronic cigarette according to claim 1, wherein the first groove is any one of square groove, circular groove, and waist-shaped groove.

* * * * *